Dec. 13, 1955    A. J. STEINBACH    2,726,683
PIPE BLIND WITH FAILURE INDICATOR
Filed Aug. 30, 1951
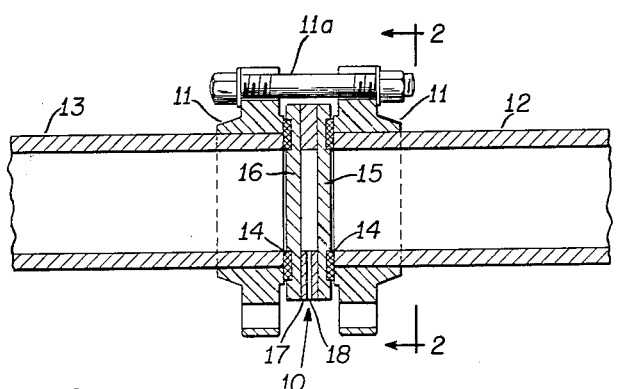
Fig. 1
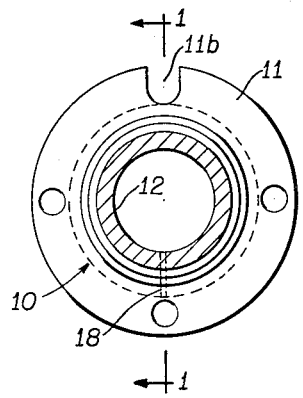
Fig. 2
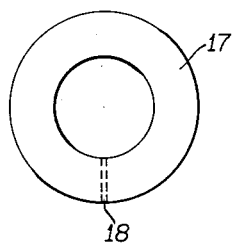
Fig. 3
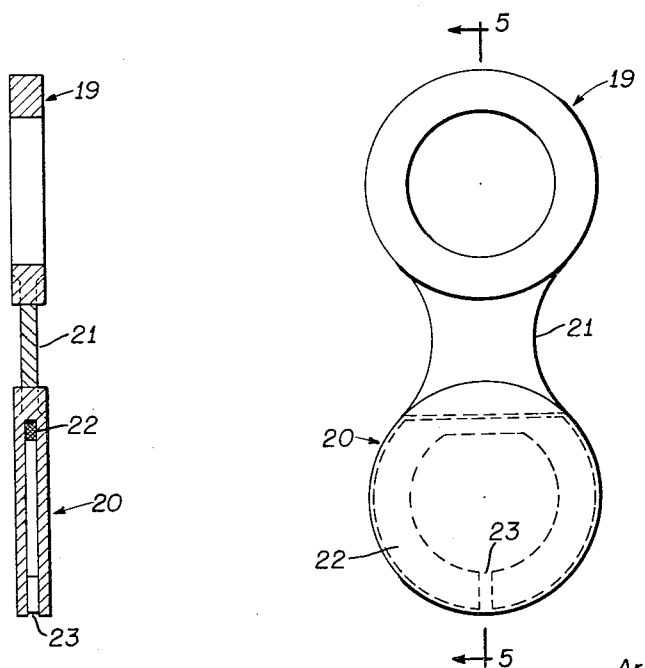
Fig. 4
Fig. 5
INVENTOR.
Arthur J. Steinbach
BY
Everett A. Johnson
ATTORNEY United States Patent Office 2,726,683
Patented Dec. 13, 1955

2,726,683

PIPE BLIND WITH FAILURE INDICATOR

Arthur J. Steinbach, Lansing, Ill., assignor to Standard Oil Company, Chicago, Ill., a corporation of Indiana Application August 30, 1951, Serial No. 244,378

9 Claims. (Cl. 138—94.3)

This invention relates to a special type of flow-control apparatus employed where it is desired to effect a temporary but positive shut-off of a given conduit or line.

In various refinery and chemical operations it becomes necessary from time to time to block completely a transfer line for a given period. For this service a gate or plug valve is not entirely satisfactory, experience having taught that valves of this type do not provide a really positive shut-off without attention. One common method of effecting the temporary cut-off is to separate a pair of pipe flanges by unbolting, inserting a blind between them, and rebolting. A number of special types of joints and unions are available to facilitate the insertion and removal of the blind. For example, one such apparatus is shown by U. S. Patent 2,566,343 entitled "Positive Shut-Off Device." This invention, however, does not relate to the particular means for separating the adjacent portions of the line and therefore further details are not given.

Blind failures are sufficiently frequent to cause considerable trouble. Thus, if the blind corrodes it is no longer effective for segregating the stock on opposite sides of the blind and stock contamination results. Furthermore, the failure of a blind is concealed and it is not possible to determine whether or not a given blind is effective after a term of service without removing it. Accordingly, there may result considerable loss and inconvenience when using the present form of disc or figure-8 type blind, due to the inability of the operator to ascertain immediately whether the blind has failed. In the case of high pressure differentials across the blind, much damage can occur.

It is therefore an object of my invention to provide a simple and foolproof apparatus for not only effecting a positive cut-off in a transfer line but to indicate a failure of such a blind. A further object is to provide an apparatus which minimizes the possibility of stock contamination even in the event of failure of the blind. These and other objects will become apparent as the description of my invention proceeds.

Briefly I attain the objects of my invention by providing a blind which comprises two spaced plates and an intermediate annular plate or ring forming an indicator chamber between the plates. A duct or channel extends from the indicator chamber to the exterior of the blind to serve as a telltale upon failure of either plate.

The channel in the intermediate indicator ring can be either an untapped hole for pressure bleeding of nonhazardous materials or a tapped hole for installation of a pressure gage on hazardous materials or high pressure lines. The indicator ring therefore reveals the blind failure by the presence of leakage or change in gage pressure. In the event that either one of the plates in the unit fails, the fluid escapes from the associated line into the space between the two blinding plates and thence through the telltale. By this means fluid from either portion of the line is confined by the blind which remains intact and the fluid is not permitted to enter the other portion of the line. Also, the escape of the fluid through the telltale warns the operator when something is wrong and the blind assembly can be replaced immediately or at some later convenient time.

The invention will be more fully understood by reference to the accompanying drawings wherein corresponding elements are designated by similar reference characters and wherein:

Figure 1 is a longitudinal section of an assembly employing my novel pipe blind;

Figure 2 is a view taken along the line 2—2 in Figure 1;

Figure 3 is a front view of the indicator plate or ring employed in Figure 1; and Figures 4 and 5 represent a figure-8 blind employing an embodiment of my invention.

Referring to the drawing, the modified blind unit 10 includes a solid blind plate 15, a second solid blind plate 16, and an intermediate indicator plate or spacer ring 17 having a telltale bore or channel 18. The three plates 15, 16, and 17, preferably of the same size and peripheral configuration, can be fixed together as a unit as by welding, riveting, a peripheral loop, or the like. The blind unit 10 is disposed between flanges 11 on conduits 12 and 13 and draw bolts 11a (not all shown) pass through the flanges 11 to complete the connection.

In Figures 4 and 5 my blind is shown in a figure-8 blind comprising a flow ring 19 and a blind plate assembly 20 joined by a web or neck 21. The blinding plate 20 is adapted to be engaged or clamped between the flanges 11 in a manner similar to unit 10 and thereby to blind off or block the line. The blinding portion 20 is closed or imperforate while the ring portion 19 has an orifice or flow opening preferably of the same diameter as the line. Thus when the ring portion 19 is engaged between the sections there is a free unrestricted fluid passage through the blind.

The blind plate assembly 20 is illustrated as being a disc split in a plane parallel to the faces of the blind assembly to accommodate an annular gasket or spacer 22 which has a segment removed to provide a telltale channel 23 corresponding to the telltale bore 18 in the indicator plate 17 of Figures 1-3. Other means may be provided for spacing the two portions of the split blind plate assembly. For example, the inner faces of the split plate can be deformed or milled to prevent a clamping seal between them. Likewise, the blind plate assembly 20 may be fabricated from individual plates and fixed to the web 21 as for example by welding. In any event the construction of the indicator plate or ring 22 may correspond to that described with reference to the indicator plate 17 in the other embodiment of the invention.

The units 10 and 20 are flat with exterior faces finished parallel for fluid-tight contact with the flanges 11. It may be preferred, however, to provide deformable means for sealing between the opposite faces of the blind and the flanges. For this purpose suitable gaskets 14 can be provided on the opposite sides of the units 10 and 20. If desired, these may be molded packing rings set in grooves in the contact faces of the blinds. It is to be understood, however, that in some instances appropriate sealing means may be disposed on the faces of the flanges 11 to seal with the opposite faces of the blind 10 or 20.

The embodiments of my invention described above and illustrated in the drawings may be provided with an indicator or telltale fluid within the chamber between the plates. Such fluid may for example comprise a material which will be ejected from the chamber by flow of the stock from the line through the perforated blind. Suitable fluids may be finely divided graphite or carbon, a pigmented liquid such as red lead, or any other material which would give a visible signal that the blind has failed. Likewise, the telltale chamber can be provided with a volatile odorant sealed by a frangible cap over the telltale. Thus, upon failure of the blind, the cap or seal will be broken by the pressure of the line, and the odorant released to signal the failure of the blind.

Although I have described preferred embodiments of my invention in considerable detail, it should be understood that this is by way of illustration only and that many modifications and changes can be made therein by those skilled in the art without departing from the spirit of the described invention or from the scope of the appended claims.

I claim:

1. A line blind adapted to be removably inserted as a unit between adjacent ends of flanged conduits comprising a pair of imperforate plates having parallel plane surfaces and having a dimension greater than the flow area of such conduits, an annular indicator ring intermediate said plates, said annular ring and plates together defining an inner chamber substantially co-extensive to the flow area of said conduits, and a telltale duct in said ring communicating between said chamber and the exterior of said blind.

2. An apparatus for providing a temporary blind between adjacent ends of flanged line sections and for indicating the failure of such blind comprising a pair of flat, inflexible, imperforate plates of greater diameter than said line and adapted to be held between said ends of the flanged line sections, an annular spacer ring fixed between said plates adjacent the periphery thereof, said ring and plates forming a chamber having planar walls substantially in register with the flow area of the line which is blocked by the blind, and a telltale duct extending from said chamber radially through said annular ring and communicating with the atmosphere at the outer periphery thereof.

3. A line blind having a corrosion-indicating means comprising a pair of spaced, flat, imperforate plates of greater diameter than the line to be blocked, a spacer ring means fixed to said plates, said ring and plates comprising a unitary assembly with an inner chamber in register with the flow area of the line to be blocked, and a channel extending radially from said chamber through said ring in communication with the atmosphere whereby a failure of either plate defining said chamber is indicated by a continuing flow of fluids from said channel.

4. A blind for a line comprising a pair of similar flat, imperforate, circular plates, annular spacer means fixed between said plates for maintaining said plates in spaced array to produce a unit having substantially parallel exterior imperforate plate surfaces and an interior chamber, and a telltale duct extending from said chamber and through the annular spacer means into communication with the exterior of said blind.

5. An apparatus for providing a temporary blind across a flanged line and for indicating failure of such blind comprising a pair of flat, circular, rigid, imperforate plates of greater diameter than said line, a chamber between said plates formed by an annular spacer ring fixed between said plates and having a central open portion in register with the flow area of said line whereby the portion of each of said imperforate plates corresponding approximately to the flow area of the line is bounded by said ring, a telltale duct communicating between said chamber and the atmosphere through said annular ring, and gasket means on the exterior face of said plates adapted to be placed in register with adjacent ends of such flanged line.

6. The blind of claim 4 including a displaceable indicator fluid within said chamber, said fluid being ejected upon failure of the blind and being readily distinguishable.

7. The blind of claim 4 wherein the annular spacer plate has a cut-a-way segment to provide the said telltale duct.

8. In a figure-8 blind including a flow ring and a blinding disc the improvement which comprises a disc consisting essentially of a pair of spaced imperforate plate members, an annular gasket means fixed between said plate members forming a chamber between said plate members, and a duct through said annular gasket means to the periphery thereof providing communication between said chamber and the exterior of said disc.

9. The line blind of claim 3 which includes a frangible cap at the outlet of said channel whereby a failure of either plate ruptures the cap to permit the flow of fluids from the channel.

References Cited in the file of this patent

UNITED STATES PATENTS

| Number | Name | Date |
|---|---|---|
| 568,680 | Henderson | Sept. 29, 1896 |
| 1,426,956 | Case | Aug. 22, 1922 |
| 1,485,913 | Gottlieb | Mar. 4, 1924 |
| 1,926,373 | Denk | Sept. 12, 1933 |
| 1,962,168 | Andrus | June 12, 1934 |
| 2,014,000 | Kennedy | Sept. 10, 1935 |
| 2,271,282 | Young | Jan. 27, 1942 |
| 2,484,622 | Hartman | Oct. 11, 1949 |